R. W. DODGE.
STEAM AND HOT WATER DISH WASHER.
APPLICATION FILED AUG. 24, 1914.
1,142,083.
Patented June 8, 1915.
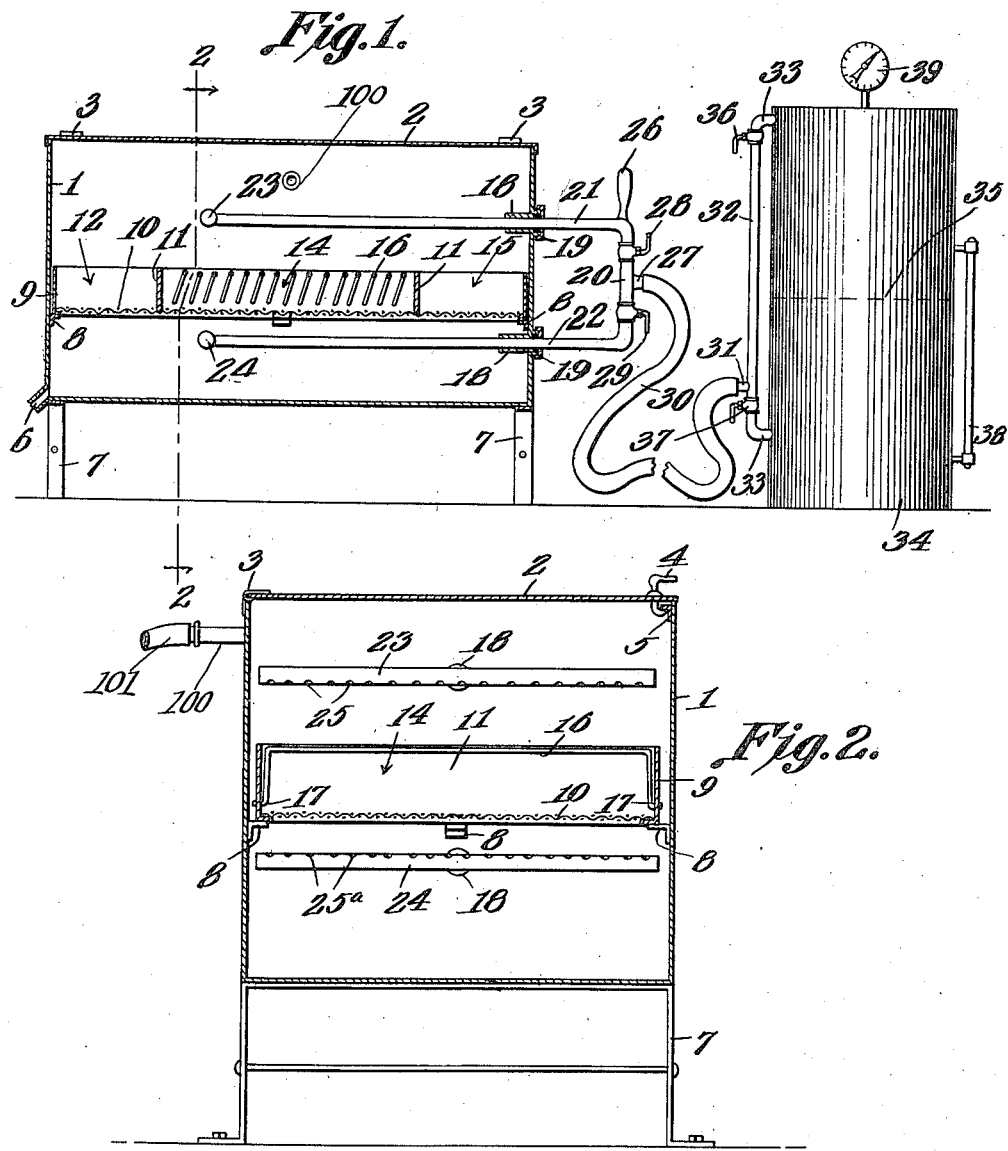

UNITED STATES PATENT OFFICE.

ROBERT W. DODGE, OF OMAHA, NEBRASKA.

STEAM AND HOT-WATER DISH-WASHER.

1,142,083.  Specification of Letters Patent.  Patented June 8, 1915.

Application filed August 24, 1914. Serial No. 858,304.

*To all whom it may concern:*

Be it known that I, ROBERT W. DODGE, a citizen of the United States, residing at Omaha, in the county of Douglas and State of Nebraska, have invented a new and useful Steam and Hot-Water Dish-Washer, of which the following is a specification.

The device forming the subject matter of this application is a dish washer, and one object of the present invention is to provide in a dish washer, a slidably mounted discharge member adapted to be moved longitudinally of a dish holding means, such as a tray, to the end that water or steam may be delivered upon the tray at different points intermediate the ends of the tray.

Another object of the invention is to provide a dish washer in which the cleansing fluid may be delivered upon the top or against the bottom of the dish holding tray, at any point intermediate the ends of the tray.

Another object of the invention is to provide novel means for selectively directing steam and hot water or a mixture of steam and hot water into the constituent arms of the discharge member.

The invention aims to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 is a side elevation depicting a dish washer embodying the present invention, certain parts being shown in vertical section and other parts appearing in elevation; Fig. 2 is a cross section on the line 2—2 of Fig. 1.

In carrying out the present invention there is provided a casing 1 including a lid 2 held in place for swinging movement by means of hinges 3 and held closed by any suitable form of locking mechanism, such as a latch 4 on the lid 2 and a keeper 5 on the casing 1. At one end, adjacent its bottom, the casing 1 is supplied with an outlet 6 which may communicate with a sewer or drain (not shown). The casing 1 may be upheld upon a suitable frame 7 of any desired sort. Located within the casing 1 are brackets 8 upon which rests removably a tray 9 provided with a foraminous bottom 10, there being partitions 11 which extend transversely of the tray 9 and divide the same into compartments 12, 14 and 15. There may be any number of these compartments, three compartments being shown in the present instance. Located in the compartment 14 are bail-shaped separators 16, the lower ends of which are pivoted in the side walls of the tray 9 as shown at 17.

Projecting inwardly from one end wall of the casing 1 are tubular guides 18 and upon the outer face of said wall, in alinement with the guides 18 are packing glands 19.

The invention includes a slidably mounted discharge member, the same comprising an intermediate portion 20 and arms 21 and 22, the arms 21 and 22 being slidable in the guides 18 and in the glands 19. The arm 21 lies above the tray 9 and the arm 22 lies below the tray. At its inner end the tubular arm 21 of the discharge member is equipped with a transverse tubular head 23 having perforations 25 upon its lower face, these perforations being adapted to discharge downwardly upon the tray 9. Attached to the inner end of the tubular arm 22 is a transverse discharge head 24, perforated upon its upper side, as shown at 25ª, so as to discharge upwardly against the foraminous bottom 10 of the tray 9. The intermediate portion 20 of the discharge member lies outside of the casing 1 and is provided with an operating handle 26.

In the intermediate portion 20 of the U-shaped discharge member are located cut off valves 28 and 29 and between the valves 28 and 29 the intermediate portion 20 of the discharge member is supplied with a nipple 27 communicating with one end of a flexible pipe 30 which may be of any desired length. The pipe 30 communicates with any suitable means for supplying steam and hot water to the casing portion of the dish washer. As shown in the drawings, the pipe 30 is connected with a nipple 31 formed upon a manifold 32, the ends 33 of which enter a boiler or tank 34 upon opposite sides of the water level 35 in the boiler. Interposed in the manifold 32 are valves 36 and 37 lying upon opposite sides of the nipple 31. The tank or boiler may be provided with a water gage 38 and with a pressure gage 39.

In practical operation, the U-shaped discharge member 20—21—22 may be slid horizontally through the medium of the handle 26 and thus the discharge heads 23 and 24 may be positioned at different points between the ends of the dish holding tray 9. Thus, the dishes in the tray 9 will be cleansed by the fluid traversing the arms 21 and 22 and the head 23 and 24. When it is desired that the arm 21 shall operate alone and shall convey steam to the contents of the tray 9, the valve 29 is closed, the valve 28 is opened, the valve 37 is closed and the valve 36 is opened. Should the operator desire to deliver hot water through the arm 21 only, the valve 29 is closed, the valve 28 is opened, the valve 36 is closed and the valve 37 is opened. Should it be desired to employ the arm 22 only and to pass steam therethrough, the valve 28 is closed, the valve 29 is opened, the valve 37 is closed and the valve 36 is opened. When hot water is to be passed through the arm 22 only, the valve 28 is closed, the valve 29 is opened, the valve 36 is closed and the valve 37 is opened. When steam is to traverse both of the arms 22 and 21, the valve 28 is opened, the valve 29 is opened, the valve 37 is closed and the valve 36 is opened. If hot water is to traverse both of the arms 22 and 21, the valve 28 is opened, the valve 29 is opened, the valve 36 is closed, and the valve 37 is opened. When a mixture of steam and hot water is to be delivered through the arms 22 and 21, the valves 28, 29, 36 and 37 are opened. If a mixture of steam and hot water is to be delivered through the arm 21 only, the valves 36, 37 and 28 are opened and the valve 29 is closed. If a mixture of steam and hot water is to traverse the arm 22 only, the valves 36, 37 and 29 are opened and the valve 28 is closed.

From the foregoing it will be seen that a mixture of hot water and steam, steam only or hot water only may be delivered to each of the arms 22 and 21 separately; hot water may be delivered to both arms at once; steam may be delivered to both arms at once; and a mixture of steam and hot water may be delivered to both arms at once.

The device will operate satisfactorily without the use of soap and the dishes will dry readily, without wiping, either by removing the tray 9 from the casing 1, or by opening the lid 2.

Flat ware ordinarily is located in the compartment 14, the pieces of flat ware being separated by the bails 16. The hollow ware which is to be cleansed is placed in the compartments 12 and 15, and ordinarily is inverted therein so as to be washed by the upward flow of fluid proceeding through the lower arm 22 and its discharge head 24.

The casing 1 may be provided with a nipple 100 adapted to receive an outlet pipe 101, the function of which is to conduct away the steam generated within the casing.

Having thus described the invention, what is claimed is:—

1. In a dish washer, a casing; a dish holding means therein; a discharge member slidable in the casing and including arms located upon opposite sides of the dish holding means; a source of steam and hot water supply; and means for directing steam and hot water respectively into the arms selectively.

2. In a dish washer, a casing; a dish holding means therein; a discharge member slidable in the casing and including arms located upon opposite sides of the dish holding means; a source of steam and hot water supply; and means for directing a mixture of steam and hot water into the arms selectively.

3. In a dish washer, a casing; a dish holding means therein; a discharge member slidable in the casing and including arms located upon opposite sides of the dish holding means; a source of steam and hot water supply; and means for directing steam and hot water, respectively, into the arms selectively, and for directing a mixture of steam and hot water into the arms selectively.

4. In a dish washer, a casing; a dish holding means therein; a U-shaped pipe including arms located upon opposite sides of the dish holding means, the pipe being slidable in the casing; valves in the U-shaped pipe; and a source of hot water and steam supply discharging into the U-shaped pipe between the valves.

5. In a dish washer, a casing; a dish holding means therein; a U-shaped pipe including arms located upon opposite sides of the dish holding means, the pipe being slidably mounted in the casing; a hot water and steam tank; a manifold connecting the upper and lower portions of the tank; valves in the manifold; valves in the U-shaped pipe; and a connection between that portion of the U-shaped pipe which lies between the valves of said pipe, and that portion of the manifold which lies between the valves of the manifold.

In testimony that I claim the foregoing as my own, I have hereto affixed my signature in the presence of two witnesses.

ROBERT W. DODGE.

Witnesses:
Louise Fossum,
Anton Gilsen.